United States Patent
Furuya et al.

(10) Patent No.: US 11,708,995 B2
(45) Date of Patent: Jul. 25, 2023

(54) AIR-CONDITIONING APPARATUS

(71) Applicant: Mitsubishi Electric Corporation, Tokyo (JP)

(72) Inventors: Koji Furuya, Tokyo (JP); Kimitaka Kadowaki, Tokyo (JP); Koji Azuma, Tokyo (JP); Yuji Motomura, Tokyo (JP); Yasushi Okoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 382 days.

(21) Appl. No.: 17/264,045

(22) PCT Filed: Sep. 28, 2018

(86) PCT No.: PCT/JP2018/036312
§ 371 (c)(1),
(2) Date: Jan. 28, 2021

(87) PCT Pub. No.: WO2020/065924
PCT Pub. Date: Apr. 2, 2020

(65) Prior Publication Data
US 2021/0372655 A1 Dec. 2, 2021

(51) Int. Cl.
*F24F 11/85* (2018.01)
*F24F 11/88* (2018.01)
(Continued)

(52) U.S. Cl.
CPC ............ *F24F 11/85* (2018.01); *F24F 1/0059* (2013.01); *F24F 1/08* (2013.01); *F24F 1/14* (2013.01); *F24F 11/88* (2018.01); *F24F 1/32* (2013.01)

(58) Field of Classification Search
CPC .......... F24F 11/85; F24F 11/88; F24F 1/0059; F24F 1/08; F24F 1/14; F24F 1/32;
(Continued)

(56) References Cited

U.S. PATENT DOCUMENTS

2006/0100796 A1* 5/2006 Fraden ............... A47L 9/19
702/50
2015/0267941 A1* 9/2015 Kato ................... F25B 49/02
62/235.1
(Continued)

FOREIGN PATENT DOCUMENTS

JP 2017-053507 A 3/2017

OTHER PUBLICATIONS

International Search Report of the International Searching Authority dated Nov. 13, 2018 for the corresponding International application No. PCT/JP2018/036312 (and English translation).

*Primary Examiner* — Nelson J Nieves
(74) *Attorney, Agent, or Firm* — Posz Law Group, PLC

(57) ABSTRACT

An air-conditioning apparatus according to the present disclosure includes a heat medium circulation circuit, a heat-source-side device, and a voltage drop device. In the heat medium circulation circuit, a pump, an indoor heat exchanger, and a flow control device are connected by pipes to circulate the heat medium. The pump sends a heat medium that contains water or brine and transfers heat. The indoor heat exchanger causes heat exchange to be performed between the heat medium and an indoor air in an air-conditioned space. The flow control device controls a flow rate of the heat medium in the indoor heat exchanger. The heat-source-side device heats or cools the heat medium before the heat medium is sent to the indoor heat exchanger. The voltage drop device reduces a voltage that is applied to the pump based on a value of a current that is supplied to the pump, in association with a flow rate of the heat medium in the heat medium circulation circuit.

13 Claims, 7 Drawing Sheets

(51) Int. Cl.
    *F24F 1/14*     (2011.01)
    *F24F 1/32*     (2011.01)
    *F24F 1/0059*     (2019.01)
    *F24F 1/08*     (2011.01)

(58) Field of Classification Search
    CPC ............ F25B 2313/003; F25B 2600/13; F25B 25/005; F25B 13/00
    See application file for complete search history.

(56) References Cited

U.S. PATENT DOCUMENTS

| | | | |
|---|---|---|---|
| 2015/0330673 A1* | 11/2015 | Honda | F25B 13/00 |
| | | | 62/324.1 |
| 2019/0204203 A1* | 7/2019 | Nix | B01D 46/0086 |
| 2020/0072510 A1* | 3/2020 | Brown | F25B 41/35 |
| 2020/0282356 A1* | 9/2020 | Kamei | F25D 23/00 |

* cited by examiner

AIR-CONDITIONING APPARATUS

CROSS REFERENCE TO RELATED APPLICATION

This application is a U.S. national stage application of International Application No. PCT/JP2018/036312, filed on Sep. 28, 2018, the contents of which are incorporated herein by reference.

TECHNICAL FIELD

The present disclosure relates to an air-conditioning apparatus, and in particular, to an air-conditioning apparatus that circulates a heat medium, such as water, which is different from refrigerant, to perform air-conditioning.

BACKGROUND

In a given air-conditioning apparatus, a heat medium circulation circuit is provided to circulate a heat medium containing water or brine, between a heat-source-side device and an indoor unit, to thereby perform air-conditioning. In such an air-conditioning apparatus, the heat-source-side device heats or cools the heat medium to supply heat to the indoor unit. The indoor unit heats or cools an indoor air with the heat supplied by the heat medium, thereby performing air-conditioning (see Patent Literature 1, for example).

The heat medium circulation circuit is provided with a pump that pressurizes the heat medium. In general, in the case where an air-conditioning apparatus is installed at a building, a pump that has a larger capacity than a required capacity estimated for the air-conditioning apparatus is selected and installed in consideration of a pressure loss that occurs because of scale deposition and a change in heat load that is made due to installation of an additional indoor unit, and for other reasons.

PATENT LITERATURE

Patent Literature 1: Japanese Unexamined Patent Application Publication No. 2017-053507

However, in such an air-conditioning apparatus, when the pump is driven at a maximum capacity, the flow velocity of the heat medium that flows in the heat medium circulation circuit is increased. When the flow velocity of the heat medium is increased, in a flow passage, such as a pipe, in the heat medium circulation circuit, a protective film formed on the pipe may be peeled off, and corrosion of the pipe, such as erosion corrosion, may occur.

SUMMARY

The present disclosure is applied to solve the above problems, and relates to an air-conditioning apparatus in which erosion corrosion can be prevented from occurring in a flow passage in a heat medium circulation circuit.

An air-conditioning apparatus according to the present disclosure includes a heat medium circulation circuit, a heat-source-side device, and a voltage drop device. In the heat medium circulation circuit, a pump, an indoor heat exchanger, and a flow control device are connected by pipes to circulate the heat medium. The pump sends a heat medium that contains water or brine and transfers heat. The indoor heat exchanger causes heat exchange to be performed between the heat medium and an indoor air in an air-conditioned space. The flow control device controls a flow rate of the heat medium in the indoor heat exchanger. The heat-source-side device heats or cools the heat medium before the heat medium is sent to the indoor heat exchanger. The voltage drop device reduces a voltage that is applied to the pump based on a value of a current that is supplied to the pump, in association with a flow rate of the heat medium in the heat medium circulation circuit.

In the embodiment of the present disclosure, the voltage drop device reduces the voltage that is applied to the pump. Thus, based on the value of a current that corresponds to the flow rate of the heat medium that flows in the heat medium circulation circuit, the voltage that is applied to the pump can be reduced, and the flow velocity of the heat medium that flows in the heat medium circulation circuit can be reduced. It is therefore possible to prevent erosion corrosion in a flow passage such as a pipe.

DETAILED DESCRIPTION

Figure 1:
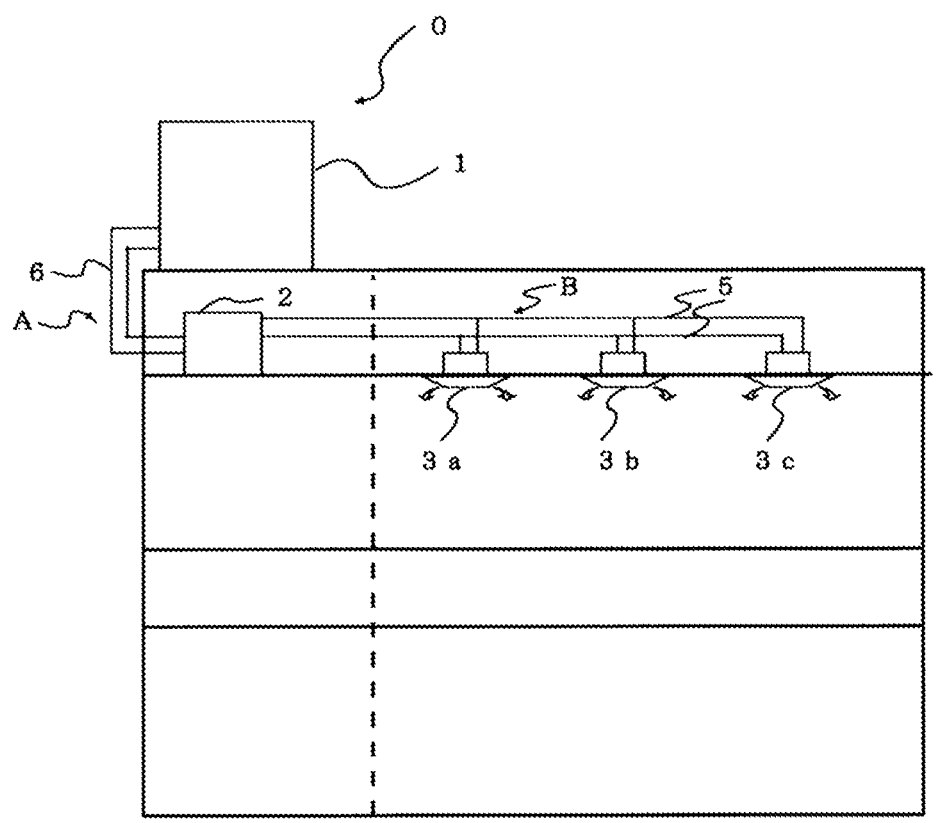
FIG. 1 is a schematic diagram illustrating an example of installation of an air-conditioning apparatus 0 according to Embodiment 1 of the present disclosure.

An air-conditioning apparatus according to each of embodiments of the present disclosure will be described with reference to the drawings. In each of the figures in the drawings, components which are the same as or equivalent to those in a previous figure are denoted by the same reference signs. The same is true of the entire text of the "Description of Embodiments" section. Also, the configurations of components are described by way of example in the entire specification, and are not limited to those described in the specification. In particular, in the case where components are combined, it is not limited to the case where components according to the same embodiment are combined. A component in an embodiment can be applied to another embodiment as appropriate. Also, the levels of temperature, pressure, etc., are not determined in relation to absolute values, that is, they are relatively determined in accordance with the state and operation of the system or apparatus, for example. In addition, with respect to a plurality of devices that are of the same type and distinguished from each other by suffixes, in the case where they do not particularly need to be identified or distinguished from each other, the suffixes may be omitted.

Embodiment 1

FIG. 1 is a schematic diagram illustrating an example of installation of an air-conditioning apparatus 0 according to Embodiment 1 of the present disclosure. The example of installation of the air-conditioning apparatus 0 according to Embodiment 1 will be described with reference to FIG. 1. The air-conditioning apparatus 0 includes a heat-source-side refrigerant cycle circuit A that circulates a heat-source-side refrigerant, and a heat medium circulation circuit B that circulates a heat medium, such as water, that receives and transfers heat and does not change in phase in a use temperature range. The air-conditioning apparatus 0 performs air-conditioning by performing cooling/heating operation or another operation. The heat-source-side refrigerant cycle circuit A operates as a heat-source-side device that supplies a heating energy or a cooling energy to an indoor space by heating or cooling the heat medium in the heat medium circulation circuit B.

Referring to FIG. 1, the air-conditioning apparatus 0 according to Embodiment 1 includes a single outdoor unit 1 serving as a heat source apparatus, a plurality of indoor units 3 (indoor units 3a to 3c), and a relay unit 2. The relay unit 2 is a unit through which heat is transferred between heat-source-side refrigerant that circulates in the heat-source-side refrigerant cycle circuit A and the heat medium that circulates in the heat medium circulation circuit B. The outdoor unit 1 and the relay unit 2 are connected by a refrigerant pipe 6 that serves as a flow passage for the heat-source-side refrigerant. It should be noted that a plurality of relay units 2 may be connected to the outdoor unit 1 such that the relay units 2 are arranged side by side Each of the indoor units 3 is connected to the relay unit 2 by a heat medium pipe 5 that serves as a flow passage for the heat medium. When the heat medium flows at a high velocity in the heat medium pipe 5, an oxide film for protecting the pipe is peeled off and erosion corrosion in which a metallic part of the pipe is corroded to change into a horseshoe shape occurs on the pipe. Such erosion corrosion especially occurs when the temperature of the heat medium is high. In order to prevent erosion, it is necessary to reduce the flow velocity of the heat medium that flows in the pipe. Although the flow velocity at which the heat medium flows to cause erosion corrosion varies depending on the kind of metal that is applied as material of the pipe, the flow velocity of the heat medium is set to 1.5 m/s or less in the case where for example, copper is used as the metal. The following description is made with respect to the case where erosion corrosion occurs at the heat medium pipe 5, however, there is also a possibility that erosion corrosion will occur at a flow passage that passes through components in the heat medium circulation circuit B As the heat-source-side refrigerant that circulates in the heat-source-side refrigerant cycle circuit A, for example, single-component refrigerant such as R-22 or R-134a, a near-azeotropic refrigerant mixture such as R-410A or R-404A, or a non-azeotropic refrigerant mixture such as R-407C can be used. In addition, refrigerant having a double bond in the chemical formula and a relatively low global warming potential, such as $CF_3CF=CH_2$, a mixture containing the refrigerant, or natural refrigerant, such as $CO_2$ or propane, can be used.

As the heat medium that circulates in the heat medium circulation circuit B, for example, brine (antifreeze liquid), water, a mixture of brine and water, or a mixture of water and an additive having a high anticorrosive effect can be used. Thus, in the air-conditioning apparatus 0 according to Embodiment 1, a substance having high safety can be used as the heat medium.

Figure 2:
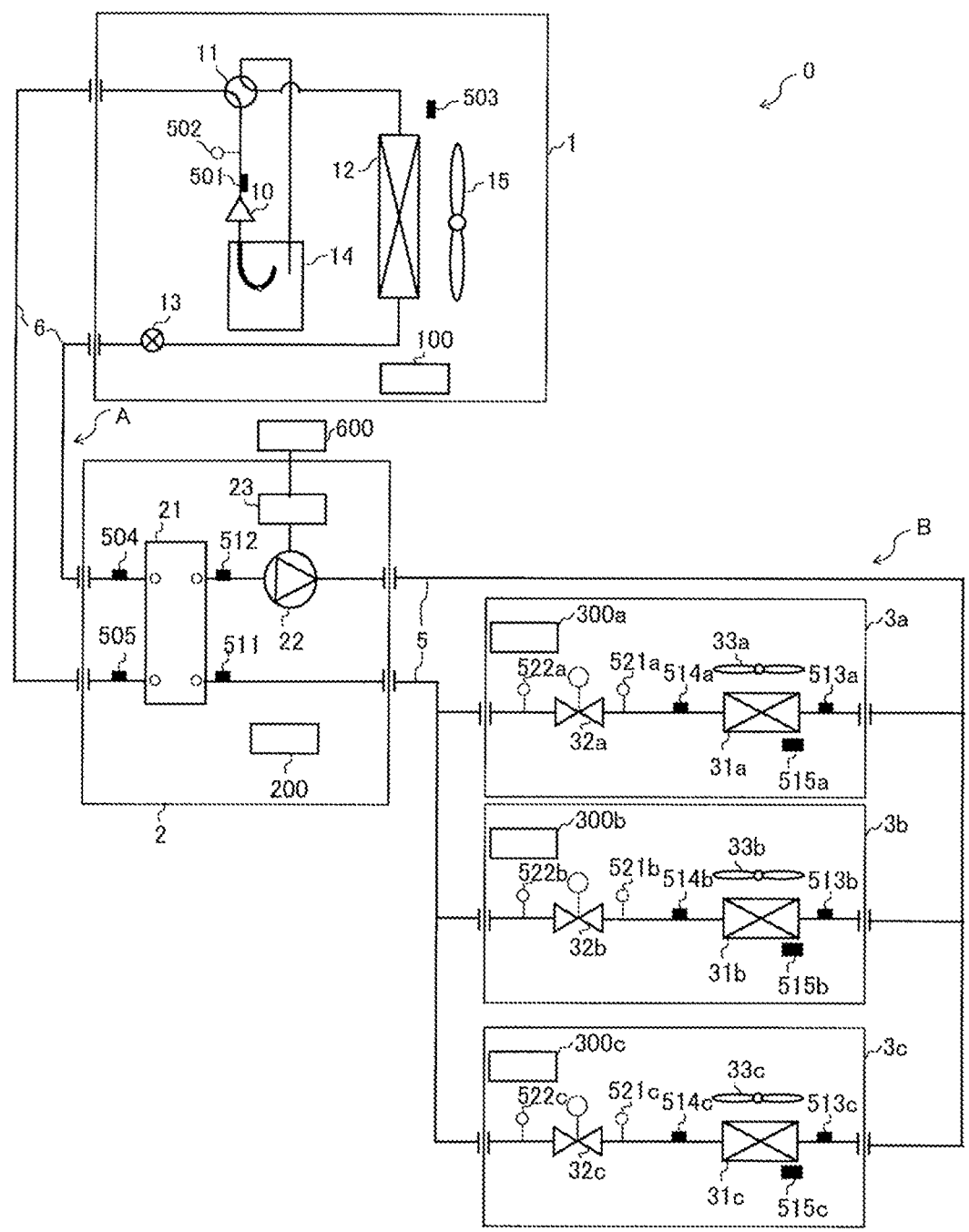
FIG. 2 is a diagram illustrating a configuration example of the air-conditioning apparatus 0 according to Embodiment 1 of the present disclosure.

FIG. 2 is a diagram illustrating a configuration example of the air-conditioning apparatus 0 according to Embodiment 1 of the present disclosure. Configurations of devices provided in the air-conditioning apparatus 0 will be explained with reference to FIG. 2. As described above, the outdoor unit 1 is connected to the relay unit 2 by the refrigerant pipe 6. Also, the indoor units 3 are connected to the relay unit 2 by the heat medium pipe 5. Referring to FIG. 2, three indoor units 3 are connected to the relay unit 2 by the heat medium pipe 5. However, the number of the indoor units 3 is not limited to three.

<Outdoor Unit 1>

The outdoor unit 1 is a unit that transfers heat by circulating the heat-source-side refrigerant in the heat-source-side refrigerant cycle circuit A and causes the heat-source-side refrigerant to exchange heat with the heat medium at a heat medium heat exchanger 21 of the relay unit 2. In Embodiment 1, cooling energy is transferred by the heat-source-side refrigerant. The outdoor unit 1 includes, in a casing thereof, a compressor 10, a heat-source-side heat exchanger 12, an expansion device 13, and an accumulator 14. The compressor 10, a refrigerant flow switching device 11, the heat-source-side heat exchanger 12, and the accumulator 14 are connected by refrigerant pipes 6 and are provided in the outdoor unit 1. The compressor 10 sucks the heat-source-side refrigerant and compresses the heat-source-side refrigerant into high-temperature and high pressure heat-source-side refrigerant, and then discharges the high-temperature, high-pressure state. It is appropriate that as the compressor 10, for example, a compressor whose capacity can be controlled or a similar compressor is used. The refrigerant flow switching device 11 is a device that switches the flow passage for the heat-source-side refrigerant between the flow passage for the heat-source-side refrigerant in a cooling operation mode and that in a heating operation mode. In the case where the air-conditioning apparatus is configured to perform only one of a cooling operation and a heating operation, the refrigerant flow switching device 11 does not need to be provided.

The heat-source-side heat exchanger 12 causes heat exchange to be performed between, for example, an outdoor air supplied by a heat-source-side fan 15 and the heat-source-side refrigerant. In the heating operation mode, the heat-source-side heat exchanger 12 operates as an evaporator and causes the heat-source-side refrigerant to receive heat. In the cooling operation mode, the heat-source-side heat exchanger 12 operates as a condenser or a radiator and causes the heat-source-side refrigerant to transfer heat. The expansion device 13 operates as a pressure reducing valve and an expansion valve, and reduces the pressure of the heat-source-side refrigerant and expands the heat-source-side refrigerant. It is appropriate that the expansion device 13 is, for example, an electronic expansion valve whose opening degree can be arbitrarily controlled to arbitrarily adjust the flow rate of the heat-source-side refrigerant, or a similar expansion valve. The accumulator 14 is provided on a suction side of the compressor 10. The accumulator 14 stores surplus refrigerant the amount of which corresponds to, for example, the difference between the amount of refrigerant that flows in the heating operation mode and that in the cooling operation mode or surplus refrigerant generated by a transitional operation change such as a change in the operation. It should be noted that in some cases, the accumulator 14 is not provided in the heat-source-side refrigerant cycle circuit A.

<Indoor Unit 3>

The indoor units 3 supply air-conditioned air to respective indoor spaces. In Embodiment 1, the indoor units 3 include respective indoor heat exchangers 31 (indoor heat exchangers 31a to 31c), respective indoor flow control devices 32 (indoor flow control devices 32a to 32c) and respective indoor-side fans 33 (indoor-side fans 33a to 33c). The indoor heat exchangers 31 and the indoor flow control devices 32 are components included in the heat medium circulation circuit B.

Each of the indoor flow control devices 32 is, for example, a two-way valve whose opening degree (opening area) can be controlled, or a similar valve. The opening degree of the indoor flow control device 32 is adjusted, whereby the indoor flow control device 32 controls the flow rate (the amount of the heat medium that flows per unit time) of the heat medium that flows into and out of the indoor heat exchanger 31. Then, the indoor flow control device 32 adjusts the amount of the heat medium that passes through the indoor heat exchanger 31 based on the temperature of the heat medium that flows into the indoor unit 3 and the temperature of the heat medium that flows out of the indoor unit 3, whereby the indoor heat exchanger 31 can cause heat exchange to be performed with an appropriate amount of heat that varies depending on a heat load of the indoor space. When the indoor heat exchanger 31 does not need to cause heat exchange with the heat load, as in the case where the operation is stopped or in a thermos-off state, the indoor flow control device 32 can fully close the valve to stop the supply of the heat medium to the indoor heat exchanger 31. Referring to FIG. 2, the indoor flow control device 32 is provided at the pipe on the outlet side of the indoor heat exchanger 31 for the heat medium, but this is not limiting. For example, the indoor flow control device 32 may be provided on the inlet side of the indoor heat exchanger 31 for the heat medium.

Furthermore, the indoor heat exchanger 31 includes, for example, heat-transfer tubes and fins. The heat medium passes through the heat-transfer tubes of the indoor heat exchanger 31. The indoor heat exchanger 31 causes heat exchange to be performed between the heat medium and air in the indoor space that is supplied from the indoor-side fan 33. When the heat medium that is cooler than air passes through the heat-transfer tubes, the air is cooled, and the indoor space is thus cooled. The indoor-side fan 33 generates an air flow that causes the air of the indoor space to pass through the indoor heat exchanger 31 and then return to the indoor space.

<Relay Unit 2>

Next, a configuration of the relay unit 2 will be described. The relay unit 2 includes components for use in heat transfer between the heat-source-side refrigerant that circulates in the heat-source-side refrigerant cycle circuit A and the heat medium that circulates in the heat medium circulation circuit B. The relay unit 2 includes the heat medium heat exchanger 21, a pump 22, and an alternating current (AC) reactor 23.

The heat medium heat exchanger 21 causes heat exchange to be performed between the heat-source-side refrigerant and the heat medium to transfer heat from the heat-source-side refrigerant to the heat medium. In the case of heating the heat medium, the heat medium heat exchanger 21 operates as a condenser or a radiator and causes the heat-source-side refrigerant to transfer heat. In the case of cooling the heat medium, the heat medium heat exchanger 21 operates as an evaporator and causes the heat-source-side refrigerant to receive heat. The pump 22 sucks and pressurizes the heat medium to cause the heat medium to circulate in the heat medium circulation circuit B. In addition, the relay unit 2 of Embodiment 1 is provided with an AC reactor 23, which is a voltage drop device, between the pump 22 and a power supply 600 that drives the pump 22. The AC reactor will be described later.

Operations of the components in the heat-source-side refrigerant cycle circuit A in the air-conditioning apparatus 0 will be described in connection with the flow of the heat-source-side refrigerant that circulates in the heat-source-side refrigerant cycle circuit A. First of all, the operations in the case where the heat medium is cooled will be described. The compressor 10 sucks the heat-source-side refrigerant and compresses the heat-source-side refrigerant into high-temperature and high-pressure heat-source-side refrigerant, and then discharges the high-temperature and high-pressure heat-source-side refrigerant. The discharged heat-source-side refrigerant flows into the heat-source-side heat exchanger 12 via the refrigerant flow switching device 11. The heat-source-side heat exchanger 12 causes heat exchange to be performed between air supplied by the heat-source-side fan 15 and the heat-source-side refrigerant, thereby condensing and liquefying the heat-source-side refrigerant. The condensed and liquefied heat-source-side refrigerant passes through the expansion device 13. When the condensed and liquefied heat-source-side refrigerant passes through the expansion device 13, the expansion device 13 reduces the pressure of the refrigerant. The heat-source-side refrigerant the pressure of which has been reduced flows out of the outdoor unit 1, passes through the refrigerant pipe 6, and flows into the heat medium heat exchanger 21 of the relay unit 2. The heat medium heat exchanger 21 causes heat exchange to be performed between the heat-source-side refrigerant and the heat medium, thereby evaporating and gasifying the heat-source-side refrigerant. At that time, the heat medium is cooled. The heat-source-side refrigerant that has flowed out of the heat medium heat exchanger 21 flows out of the relay unit 2, passes through the refrigerant pipe 6, and flows into the outdoor unit 1. Then, after re-passing through the refrigerant flow switching device 11, the heat-source-side refrigerant, which has been evaporated and gasified, is sucked by the compressor 10.

Next, the operations in the case where the heat medium is heated will be described. The compressor 10 sucks the heat-source-side refrigerant and compresses the heat-source-side refrigerant into high-temperature and high-pressure heat-source-side refrigerant, and then discharges the high-temperature and high-pressure heat-source-side refrigerant. The discharged heat-source-side refrigerant flows out of the outdoor unit 1 via the refrigerant flow switching device 11, passes through the refrigerant pipe 6, and flows into the heat medium heat exchanger 21 of the relay unit 2. The heat medium heat exchanger 21 causes heat exchange to be performed between the heat-source-side refrigerant and the heat medium, thereby condensing and liquefying the heat-source-side refrigerant. At that time, the heat medium is heated. The condensed and liquefied heat-source-side refrigerant that has flowed out of the heat medium heat exchanger 21 flows out from the relay unit 2, passes through the refrigerant pipe 6, and passes through the expansion device 13 of the outdoor unit 1. When the condensed and liquefied heat-source-side refrigerant passes through the expansion device 13, the expansion device 13 reduces the pressure of the refrigerant. The heat-source-side refrigerant the pressure of which has been reduced then flows into the heat-source-side heat exchanger 12. The heat-source-side heat exchanger 12 causes heat exchange to be performed between air supplied by the heat-source-side fan 15 and the heat-source-side refrigerant, thereby evaporating and gasifying the heat-source-side refrigerant. Then, after re-passing through the refrigerant flow switching device 11, the heat-source-side refrigerant, which has been evaporated and gasified, is sucked by the compressor 10.

In the air-conditioning apparatus 0, various sensors are provided as detection devices that detect physical quantities. In part of the heat-source-side refrigerant cycle circuit A that is located in the outdoor unit 1, a discharge temperature sensor 501, a discharge pressure sensor 502, and an outdoor temperature sensor 503 are provided. The discharge temperature sensor 501 detects the temperature of the refrigerant discharged from the compressor 10 and outputs a discharge temperature detection signal. An outdoor unit control device 100, which will be described later, receives the discharge temperature detection signal output from the discharge temperature sensor 501. The discharge temperature sensor 501 includes a thermistor or other similar devices. Other temperature sensors, which will be described below, include thermistors or other similar devices. The discharge pressure sensor 502 detects the pressure of the refrigerant discharged from the compressor 10 and outputs a discharge pressure detection signal. The outdoor unit control device 100 receives the discharge pressure detection signal output from the discharge pressure sensor 502. The outdoor temperature sensor 503 is provided at an air inflow portion of the heat-source-side heat exchanger 12 in the outdoor unit 1. The outdoor temperature sensor 503 detects, for example, an outdoor temperature, which is the temperature of air around the outdoor unit 1, and outputs an outdoor temperature detection signal. The outdoor unit control device 100 receives the outdoor temperature detection signal output from the outdoor temperature sensor 503.

Furthermore, in part of the heat-source-side refrigerant cycle circuit A that is located in the relay unit 2, a first refrigerant temperature sensor 504 and a second refrigerant temperature sensor 505 are provided. The first refrigerant temperature sensor 504 is provided at a pipe on a refrigerant inflow side of the heat medium heat exchanger 21 in the flow of the refrigerant in the heat-source-side refrigerant cycle circuit A in the case where the heat medium is cooled. The first refrigerant temperature sensor 504 and the second refrigerant temperature sensor 505 detect the temperature of the refrigerant that will flow into the heat medium heat exchanger 21 and the temperature of the refrigerant that has flowed out of the heat medium heat exchanger 21, respectively, and output refrigerant-side detection signals. A relay unit control device 200, which will be described later, receives the refrigerant-side detection signals output from the first refrigerant temperature sensor 504 and the second refrigerant temperature sensor 505.

In part of the heat medium circulation circuit B that is located in the relay unit 2, a heat medium inflow-port-side temperature sensor 511 and a heat medium outflow-port-side temperature sensor 512 are provided. The heat medium inflow-port-side temperature sensor 511 is provided at a pipe on a heat medium inflow side of the heat medium heat exchanger 21 in the flow of the heat medium in the heat medium circulation circuit B. The heat medium inflow-port-side temperature sensor 511 detects the temperature of the heat medium that will flow into the heat medium heat exchanger 21 and outputs a heat medium inflow-side detection signal. The relay unit control device 200, which will be described later, receives the heat medium inflow-side detection signal output from the heat medium inflow-port-side temperature sensor 511. The heat medium outflow-port-side temperature sensor 512 is provided at a pipe on a heat medium outflow side of the heat medium heat exchanger 21 in the flow of the heat medium in the heat medium circulation circuit B. The heat medium outflow-port-side temperature sensor 512 detects the temperature of the heat medium that has flowed out of the heat medium heat exchanger 21 and outputs a heat medium outflow-side detection signal. The relay unit control device 200 receives the heat medium outflow-side detection signal output from the heat medium outflow-port-side temperature sensor 512. Detection sensors, such as a pressure sensor and a flow rate sensor, may be provided in the part of the heat medium circulation circuit B that is located in the relay unit 2, though they are not provided in the air-conditioning apparatus 0 of Embodiment 1.

In parts of the heat medium circulation circuit B that are located in the indoor units 3, indoor inflow-port-side temperature sensors 513 (indoor inflow-port-side temperature sensors 513a to 513c) are provided, and indoor outflow-port-side temperature sensors 514 (indoor outflow-port-side temperature sensors 514a to 514c) are also provided. Each of the indoor inflow-port-side temperature sensors 513 detects the temperature of the heat medium that will flow into an associated one of the indoor heat exchangers 31 and outputs an inflow-side detection signal. Each of indoor unit control devices 300 to be described later that are provided in the respective indoor units 3 receives the inflow-side detection signal output from the associated indoor inflow-port-side temperature sensors 513. Each indoor outflow-port-side temperature sensor 514 detects the temperature of the heat medium that has flowed out of the associated indoor heat exchanger 31 and outputs an outflow-side detection signal. Each indoor unit control device 300 receives the inflow-side detection signal output from the associated indoor outflow-port-side temperature sensor 514.

Furthermore, in the parts of the heat medium circulation circuit B that are located in the indoor units 3, indoor inflow-side pressure sensors 521 (indoor inflow-side pressure sensors 521a to 521c) are provided, and indoor outflow-side pressure sensors 522 (indoor outflow-side pressure sensors 522a to 522c) are also provided. In each of the indoor units 3, an associated one of the indoor inflow-side pressure sensors 521 and an associated one of the indoor outflow-side pressure sensors 522 are provided on the heat medium inflow side and the heat medium outflow side of the indoor flow control device 32, respectively, and output signals corresponding to detected pressures. Also, the indoor unit control device 300 provided in the above each indoor unit 3 receives the signals corresponding to the pressures that are output from the above associated indoor inflow-side pressure sensor 521 and indoor outflow-side pressure sensor 522.

For example, in the case where the relay unit 2 is provided with a pressure sensor that detects the pressure of the entire heat medium that circulates in the heat medium circulation circuit B, the indoor inflow-side pressure sensors 521 may be omitted. Furthermore, flow rate detection devices that detect the flow rate may be provided in place of the pressure sensor. In addition, heat quantity detection devices each capable of detecting the amount of heat in heat exchange with air in the indoor space that is a heat load may be provided.

Each indoor unit control device 300, for example, makes a calculation to determine the amount of heat in heat exchange at the indoor heat exchanger 31, and then sends a signal including data on the determined amount of heat to the relay unit control device 200.

Furthermore, indoor temperature sensors 515 (indoor temperature sensors 515a to 515c) are provided in the respective indoor units 3. Each of the indoor temperature sensors 515 detects a suction temperature, which is the temperature of air that is made to flow into the associated indoor heat exchanger 31 by an air flow generated by driving the associated indoor-side fan 33, and outputs a suction temperature detection signal. It should be noted that the suction temperature can also mean the air temperature of an indoor space which is an air-conditioned space and is a heat load.

Next, a configuration of control system devices in the air-conditioning apparatus 0 of Embodiment 1 of the present disclosure will be described. As illustrated in FIG. 2, each of the unit includes a controller that controls components provided in the unit. The controller performs processing based on data on physical quantities included in the signals sent from various sensors and based on a signal regarding an instruction and settings that is sent from an input device (not illustrated) or similar devices. The controller is connected to other controllers such that wired communication connection or wireless communication connection is achieved, and is capable of communicating with the above other controllers, using signals including various data. The outdoor unit 1 includes the outdoor unit control device 100. The relay unit 2 includes the relay unit control device 200. The indoor units 3 include the respective indoor unit control devices 300 (indoor unit control devices 300a to 300c).

In communication in Embodiment 1, each indoor unit control device 300 can send, to the relay unit control device 200 of the relay unit 2, signals that include data on pressures, temperatures, etc., detected by the sensors of the associated indoor unit 3. In addition, each indoor unit control device 300 can also send, to the relay unit control device 200, data on indoor set temperature that is input from a remote control unit (not illustrated) and data obtained by calculating an amount of heat or others. Each indoor unit control device 300 can also send, to the relay unit control device 200, data on characteristics of the components included in the associated indoor unit 3, such as a heat exchange capacity of the indoor heat exchanger 31 therein.

Figure 3:
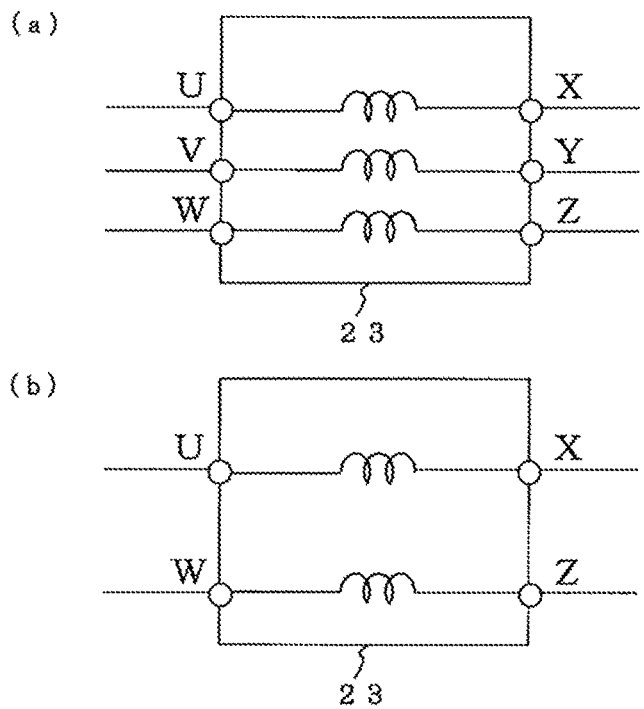
FIG. 3 is a diagram illustrating a configuration example of an alternating current (AC) reactor 23 according to Embodiment 1 of the present disclosure.

FIG. 3 is a diagram illustrating configuration examples of the AC reactor 23 according to Embodiment 1 of the present disclosure. To be more specific, FIG. 3, (a), illustrates a configuration example of the AC reactor 23 that is applied to the case where the power supply 600 is a three-phase power supply. FIG. 3, (b), illustrates a configuration example of the AC reactor 23 that is applied to the case where the power supply 600 is a single-phase power supply. As described above, the AC reactor 23 of Embodiment 1 is a voltage drop device. In addition, the AC reactor 23 reduces a high-frequency current in power supply of the power supply 600. When a current supplied from the power supply 600 increases greater than a set current, the AC reactor 23 cannot maintain a voltage applied by the power supply 600. Consequently, the voltage on an output side of the AC reactor 23 drops. The set current is a current determined depending on characteristics of the AC reactor 23 and can be arbitrarily set in designing of the AC reactor 23.

Furthermore, for example, in a chiller whose power consumption is 30 kW, 80 liters of heat medium is circulated per minute. In a chiller whose power consumption is 45 kW, 120 liters of heat medium is circulated per minute. In a chiller whose power consumption is 60 kW, 160 liters of heat medium is circulated per minute.

Figure 4:
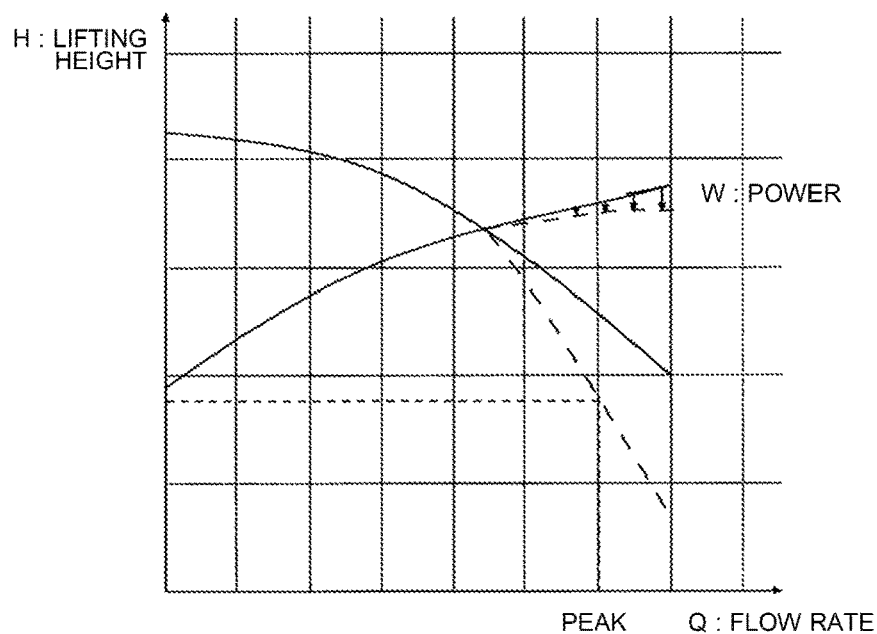
FIG. 4 is a graph illustrating a relationship between a current, a lifting height, and a flow rate in Embodiment 1 of the present disclosure.

FIG. 4 is a view indicating a relationship between a current, a lifting height, and a flow rate in Embodiment 1 of the present disclosure. Basically, the power supplied from the power supply 600 to the pump 22 and the flow rate of the heat medium are substantially proportional to each other. When the current supplied from the power supply 600 is increased because of an increase in heat load at the indoor unit 3 or for other reasons, the flow rate and the flow velocity of the heat medium are increased. In the air-conditioning apparatus 0 of Embodiment 1, when the amount of the current that is supplied from the power supply 600 is increased larger than that of a set current, the AC reactor 23, which is a voltage drop device, reduces the voltage that is applied to the pump 22, thereby reducing the power that is supplied to the pump 22 and thus also reducing the capacity of the pump 22. Consequently, the lifting height of the pump 22 is low for the flow rate of the heat medium, and the velocity of the heat medium that circulates in the heat medium circulation circuit B decreases. In the air-conditioning apparatus 0 of Embodiment 1, since the AC reactor 23 is provided between the power supply 600 and the pump 22, the heat medium is circulated such that the velocity at which the heat medium flows when the pump 22 is driven to cause the heat medium to flow at a maximum flow rate is lower than the velocity of the heat medium at which erosion corrosion occurs.

As described above, in the air-conditioning apparatus 0 of Embodiment 1, the AC reactor 23, which is a voltage drop device, is provided to reduce a voltage that is applied to the pump 22. Thus, when the value of a current that is supplied by the power supply 600 becomes greater than that of the set current because of an increase in the load or for other reasons, the voltage that is applied to the pump 22 is reduced by a voltage drop by the AC reactor 23, and the capacity of the pump 22 is reduced to a low level. Therefore, the velocity of the heat medium that circulates in the heat medium circulation circuit B can be reduced. Because the velocity of the heat medium is decreased lower than the velocity of the heat medium at which erosion corrosion occurs, erosion corrosion can be prevented in a flow passage such as a pipe. In addition, in the air-conditioning apparatus 0 of Embodiment 1, because it is unnecessary to perform control in consideration of the flow velocity of the heat medium, it is also unnecessary to provide a flowmeter for measuring the velocity of the heat medium. As a result, the cost can be reduced.

Embodiment 2

Figure 5:
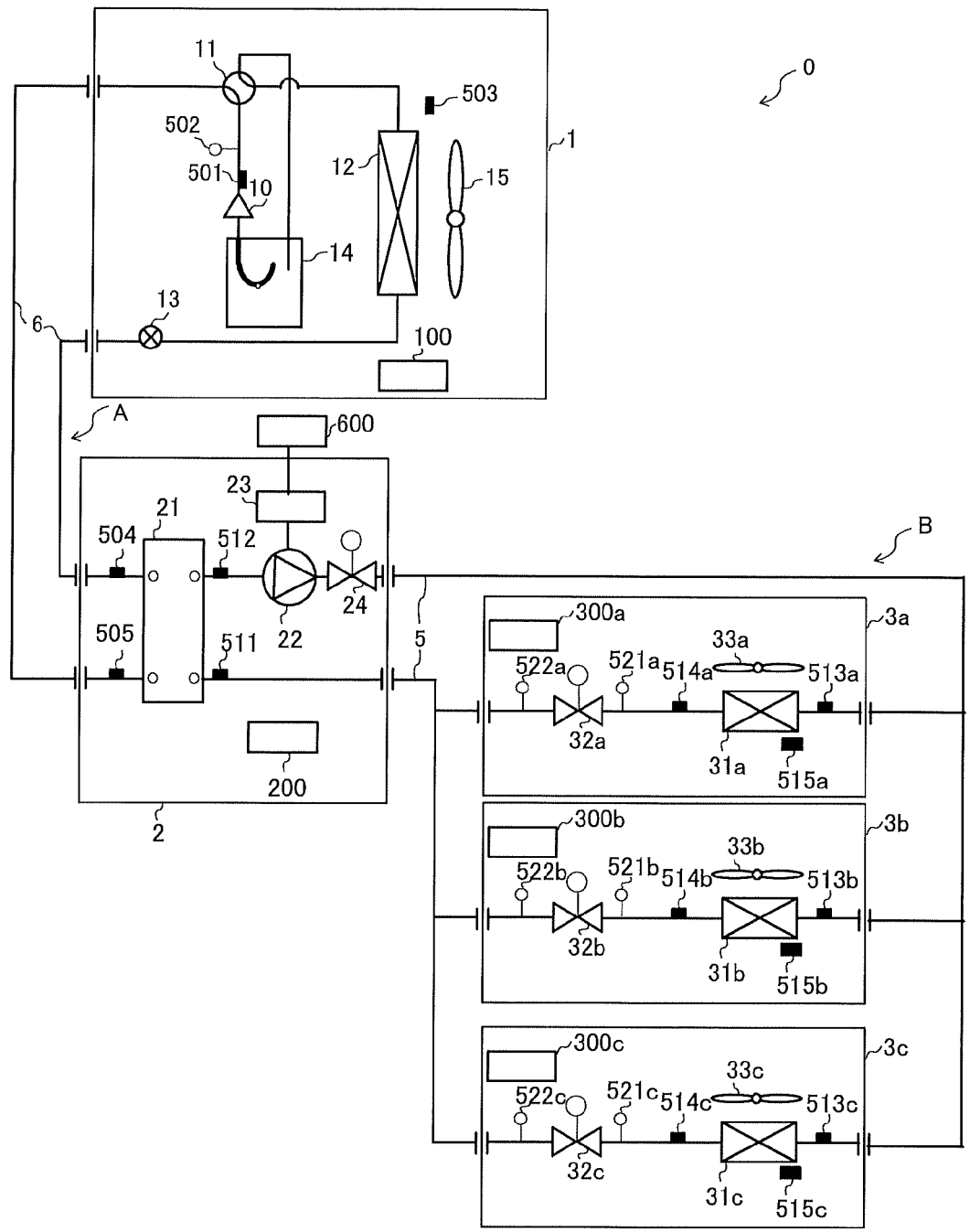
FIG. 5 is a diagram illustrating a configuration example of an air-conditioning apparatus 0 according to Embodiment 2 of the present disclosure.

FIG. 5 is a diagram illustrating a configuration example of an air-conditioning apparatus 0 according to Embodiment 2 of the present disclosure. Referring to FIG. 5, components denoted by the same reference sigs as in FIG. 2 and other figures perform the same operations as those in Embodiment 1. Referring to FIG. 5, a pressure loss adjustment device 24 adjusts the flow rate of the heat medium that is sent from the pump 22, to thereby adjust the pressure loss of the heat medium. The pressure loss adjustment device 24 of Embodiment 2 includes a valve whose opening degree can be controlled.

Figure 6:
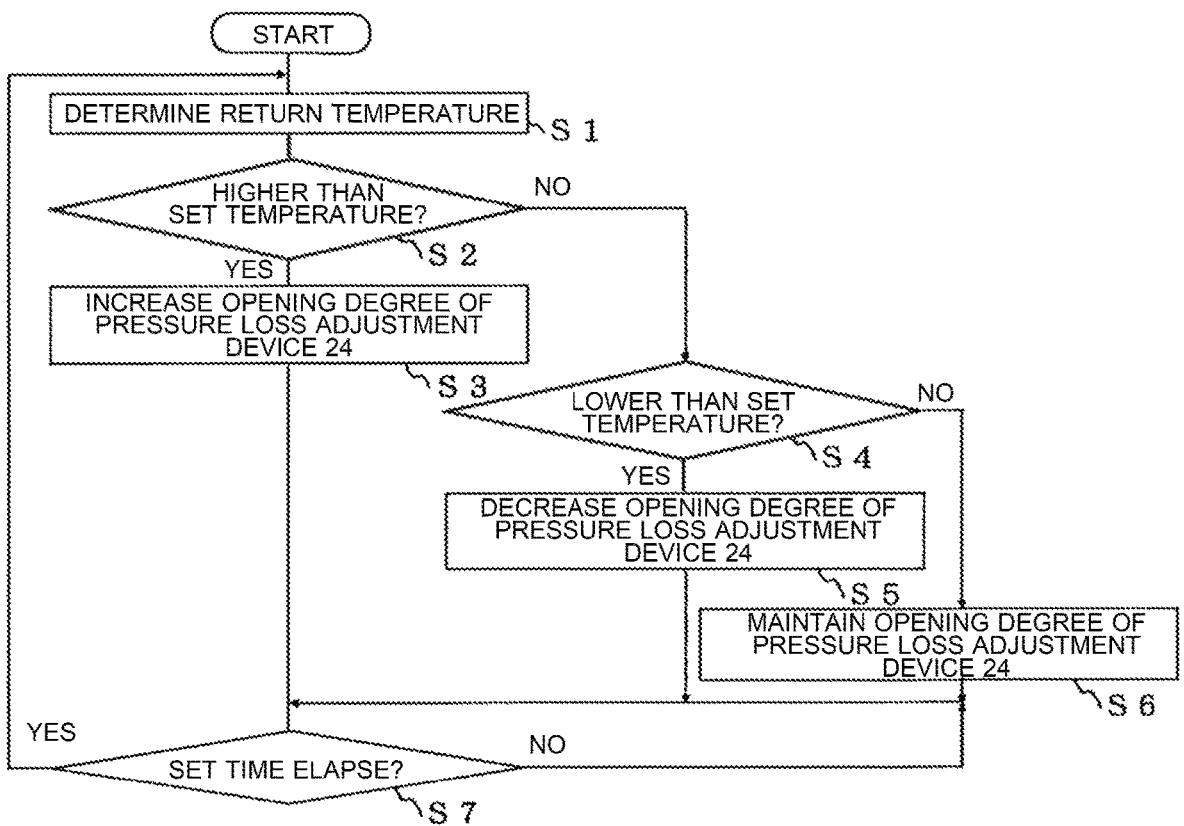
FIG. 6 is a view illustrating control of a pressure loss adjustment device 24 according to Embodiment 2 of the present disclosure.

FIG. 6 is a view for explaining control of the pressure loss adjustment device 24 according to Embodiment 2 of the present disclosure. The following description is made on the assumption that the pressure loss adjustment device 24 is controlled by the relay unit control device 200, and is also made with respect to the case where the heat medium cooled at the heat medium heat exchanger 21 is sent to indoor unit 3. The relay unit control device 200 adjusts the opening degree of the valve of the pressure loss adjustment device 24 such that a return temperature, which is the temperature of the heat medium returned from indoor unit 3, is kept at a predetermined set temperature.

When the air-conditioning apparatus 0 starts the operation, the relay unit control device 200 starts control of the pressure loss adjustment device 24. The relay unit control device 200 determines the return temperature based on a signal sent from the heat medium inflow-port-side temperature sensor 511 (step S1). The relay unit control device 200 determines whether or not the return temperature is higher than the set temperature (step S2). When determining that the return temperature is higher than the set temperature, the relay unit control device 200 controls the pressure loss adjustment device 24 to increase the opening degree by a predetermined degree (step S3). When determining that the return temperature is not higher than the set temperature, the relay unit control device 200 determines whether or not the return temperature is lower than the set temperature (step S4). When determining that the return temperature is lower than the set temperature, the relay unit control device 200 controls the pressure loss adjustment device 24 to decrease the opening degree by a predetermined degree (step S5). When determining that the return temperature is not lower than the set temperature, the relay unit control device 200 assumes that the return temperature is equal to the set temperature, and maintains the opening degree of the pressure loss adjustment device 24 (step S6). Then, the relay unit control device 200 repeats the above processing at intervals of set time (step S7).

As described above, in the air-conditioning apparatus 0 of Embodiment 2, in addition to the AC reactor 23, the pressure loss adjustment device 24 is provided in the heat medium circulation circuit B to adjust the pressure loss of the heat medium. It is therefore possible to adjust the flow rate of the heat medium that circulates in the heat medium circulation circuit B, while keeping the velocity thereof low to prevent occurrence of erosion corrosion. Because of adjustment by the pressure loss adjustment device 24, the lifting height of the pump 22 can be increased and the heat medium can thus be sent to one of the indoor units 3 that is located further from the pump 22 than the other indoor units 3. In addition, since the flow rate of the heat medium can be adjusted by the pressure loss adjustment device 24, the flow rate can be reduced when a required flow rate is low, and the power consumption can thus be reduced. Therefore, energy saving can be achieved.

Embodiment 3

Figure 7:
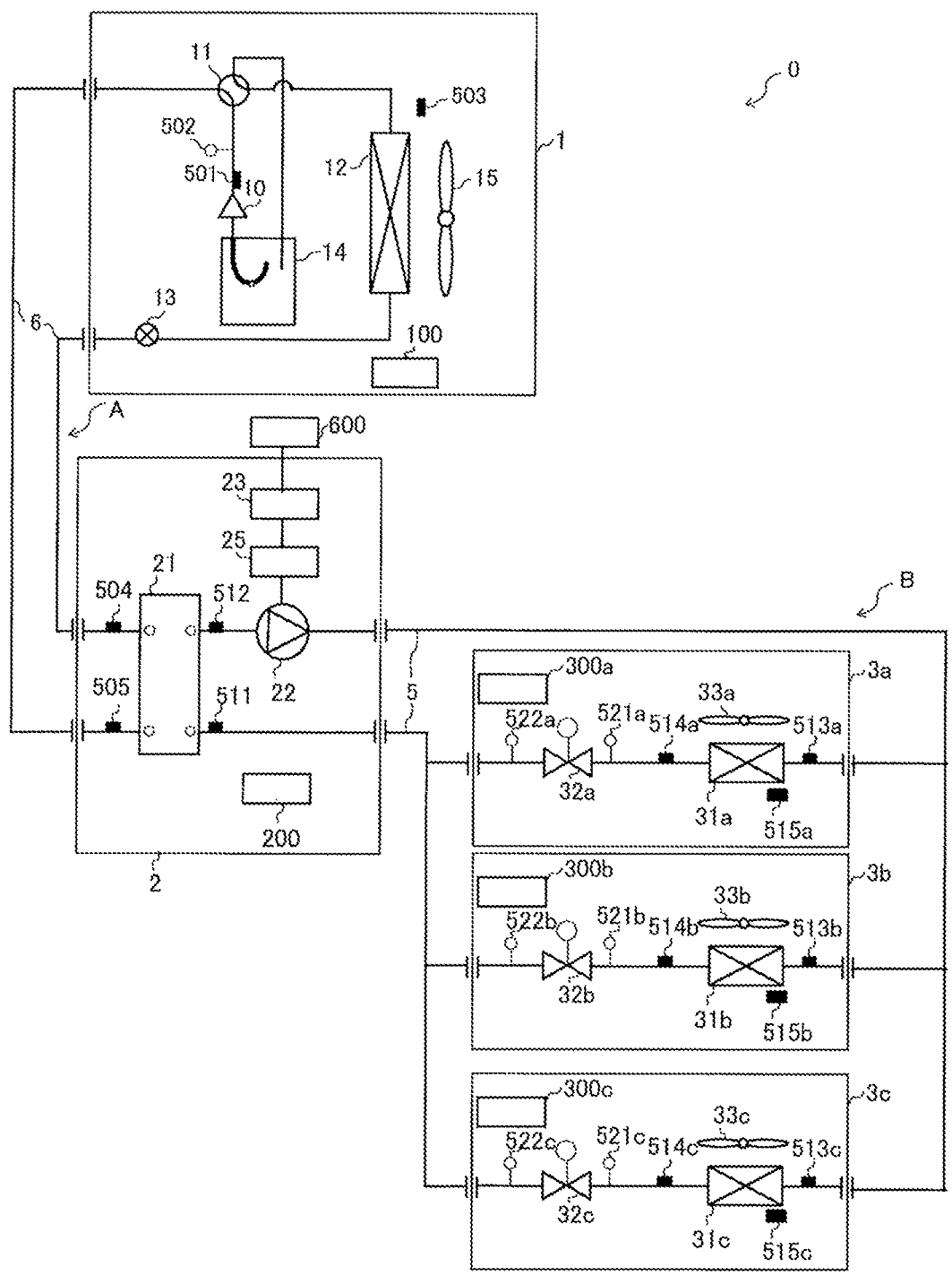
FIG. 7 is a diagram illustrating a configuration example of an air-conditioning apparatus 0 according to Embodiment 3 of the present disclosure.

FIG. 7 is a diagram illustrating a configuration example of an air-conditioning apparatus 0 according to Embodiment 3 of the present disclosure. Referring to FIG. 7, components denoted by the same reference signs as those in FIG. 2 and other figures perform the same operations as in Embodiments 1 and 2. As illustrated in FIG. 7, in the air-conditioning apparatus 0 according to Embodiment 3, an inverter device 25 is provided between the pump 22 and the AC reactor 23 that is a voltage drop device. The inverter device 25 performs AC conversion and arbitrarily changes a driving frequency related to power to be supplied to the pump 22. As a result, the rotation speed of a motor (not illustrated) included in the pump 22 can be minutely changed according to the driving frequency.

Therefore, in the air-conditioning apparatus 0 of Embodiment 3, it is possible to minutely adjust the flow rate of the heat medium that circulates in the heat medium circulation circuit B based on the value of the heat load in the indoor units 3, while keeping the velocity of the heat medium low so as not to cause erosion corrosion. In particular, in the case of supplying a predetermined heat load or less, energy saving can be achieved by adjusting the flow rate with the inverter device 25.

Embodiment 4

Regarding each of the above embodiments, it is described above that the AC reactor 23 is used as the voltage drop device, however, it is not limiting. For example, it should be noted that a voltage drop occurs when current is made to flow through a diode. Thus, a diode may be used as the voltage drop device. The configuration of the AC reactor 23 as illustrated in FIG. 3 can be applied to the diode.

Embodiment 5

Figure 8:
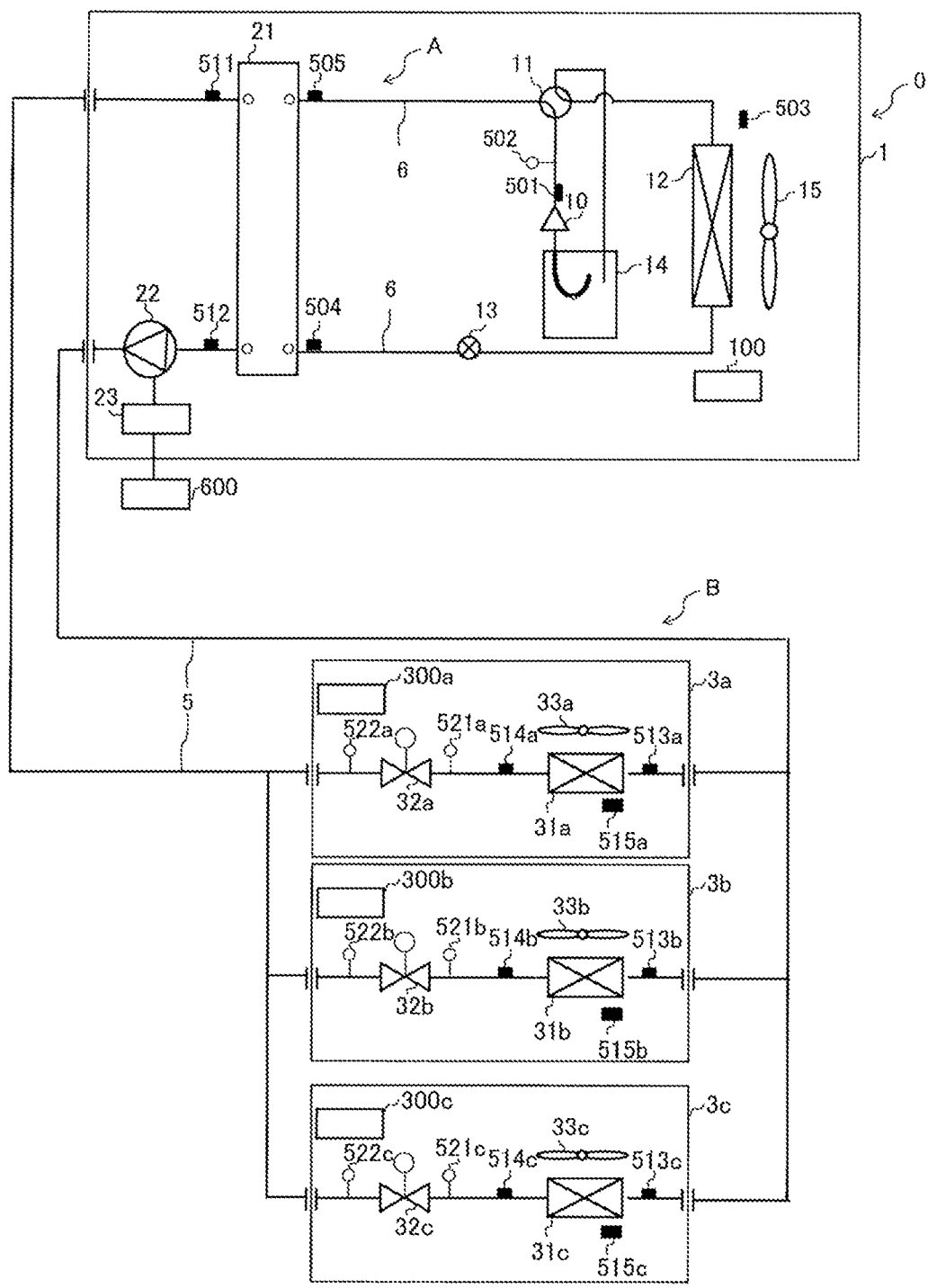
FIG. 8 is a diagram illustrating a configuration example of an air-conditioning apparatus 0 according to Embodiment 5 of the present disclosure.

FIG. 8 is a diagram illustrating a configuration example of an air-conditioning apparatus 0 according to Embodiment 5 of the present disclosure. Referring to FIG. 8, components denoted by the same reference signs as those in FIG. 2 perform the same operations as those of Embodiment 1. In the air-conditioning apparatus 0 according to Embodiment 5, the components of the relay unit 2 as described regarding Embodiments 1 and 2 are provided in the outdoor unit 1. Thus, in the air-conditioning apparatus 0 of Embodiment 5, the outdoor unit 1 and the indoor units 3 are connected by the heat medium pipes 5. The pump 22 and the AC reactor 23 provided in the heat medium circulation circuit B are provided in the outdoor unit 1. Because the outdoor unit 1 houses all the components provided in the heat-source-side refrigerant cycle circuit A, the amount of the refrigerant can be reduced. In addition, since only pipe connection of the outdoor unit 1 to the indoor units 3 is required, piping work can be facilitated.

The invention claimed is:

1. An air-conditioning apparatus comprising:
a heat medium circulation circuit in which a pump, an indoor heat exchanger, and a flow control device are connected by pipes to circulate the heat medium, the pump being configured to send a heat medium that contains water or brine and transfers heat, the indoor heat exchanger being configured to cause heat exchange to be performed between the heat medium and an indoor air in an air-conditioned space, the flow control device configured to control a flow rate of the heat medium in the indoor heat exchanger;
a heat-source-side device configured to heat or cool the heat medium before the heat medium is sent to the indoor heat exchanger; and
a voltage drop device configured to reduce a voltage that is applied to the pump, based on a value of a current that is supplied to the pump depending on a flow rate of the heat medium in the heat medium circulation circuit.

2. The air-conditioning apparatus of claim 1, wherein the voltage drop device is an AC reactor.

3. The air-conditioning apparatus of claim 1, wherein the voltage drop device is a diode.

4. The air-conditioning apparatus of claim 1, further comprising a pressure loss adjustment device configured to adjust a flow rate of the heat medium that is sent from the pump, thereby adjusting a pressure loss in the heat medium circulation circuit.

5. The air-conditioning apparatus of claim 1, further comprising an inverter device configured to perform AC conversion and cause the pump to be driven at a rotation speed corresponding to a driving frequency related to the AC conversion.

6. The air-conditioning apparatus of claim 1, wherein the heat-source-side device includes a heat-source-side refrigerant cycle circuit in which a compressor, a heat-source-side heat exchanger, an expansion device, and a heat medium heat exchanger are connected by pipes, the compressor being configured to compress a heat-source-side refrigerant, the heat-source-side heat exchanger being configured to cause heat exchange to be performed between the heat-source-side refrigerant and an outdoor air, the expansion device being configured to reduce a pressure of the heat-source-side refrigerant, and the heat medium heat exchanger being configured to cause heat exchange to be performed between the heat-source-side refrigerant and the heat medium.

7. The air-conditioning apparatus of claim 6, wherein
the compressor and the heat-source-side heat exchanger are provided in an outdoor unit, and
the heat medium heat exchanger and the pump are provided in a relay unit through which heat is transferred between the outdoor unit and an indoor unit that includes the indoor heat exchanger.

8. The air-conditioning apparatus of claim 6, wherein components included in the heat-source-side refrigerant cycle circuit and the pump are provided in the outdoor unit.

9. The air-conditioning apparatus of claim 2, further comprising a pressure loss adjustment device configured to adjust a flow rate of the heat medium that is sent from the pump, thereby adjusting a pressure loss in the heat medium circulation circuit.

10. The air-conditioning apparatus of claim 3, further comprising a pressure loss adjustment device configured to adjust a flow rate of the heat medium that is sent from the pump, thereby adjusting a pressure loss in the heat medium circulation circuit.

11. The air-conditioning apparatus of claim 2, further comprising an inverter device configured to perform AC conversion and cause the pump to be driven at a rotation speed corresponding to a driving frequency related to the AC conversion.

12. The air-conditioning apparatus of claim 3, further comprising an inverter device configured to perform AC conversion and cause the pump to be driven at a rotation speed corresponding to a driving frequency related to the AC conversion.

13. The air-conditioning apparatus of claim 4, further comprising an inverter device configured to perform AC conversion and cause the pump to be driven at a rotation speed corresponding to a driving frequency related to the AC conversion.

* * * * *